United States Patent
Thoniparambil et al.

(10) Patent No.: US 12,197,865 B2
(45) Date of Patent: Jan. 14, 2025

(54) LEARNING FRAMEWORK FOR PROCESSING COMMUNICATION SESSION TRANSCRIPTS

(71) Applicant: Capital One Services, LLC, McLean, VA (US)

(72) Inventors: Akshay Aravindakshan Thoniparambil, Bangalore (IN); Manish Agarwal, Bangalore (IN); Gaurav Kedia, Bangalore (IN); Aashish Bansiwala, Ganganagar (IN); Deepak Ramamohan, Mysuru (IN); Sourav Choudhary, Samastipur (IN)

(73) Assignee: Capital One Services, LLC, McLean, VA (US)

( * ) Notice: Subject to any disclaimer, the term of this patent is extended or adjusted under 35 U.S.C. 154(b) by 157 days.

(21) Appl. No.: 17/554,143

(22) Filed: Dec. 17, 2021

(65) Prior Publication Data
US 2023/0196020 A1 Jun. 22, 2023

(51) Int. Cl.
*G06F 40/289* (2020.01)
*G06F 16/33* (2019.01)
*G06F 16/35* (2019.01)
*G06F 40/35* (2020.01)

(52) U.S. Cl.
CPC ........ *G06F 40/289* (2020.01); *G06F 16/3344* (2019.01); *G06F 16/355* (2019.01); *G06F 40/35* (2020.01)

(58) Field of Classification Search
CPC .. G06F 40/289; G06F 16/3344; G06F 16/355; G10L 15/1815; G06N 3/08
USPC ............................ 704/4, 8–9, 231, 249, 251
See application file for complete search history.

(56) References Cited

U.S. PATENT DOCUMENTS

| | | | |
|---|---|---|---|
| 7,606,714 B2 | 10/2009 | Williams | |
| 9,477,752 B1 | 10/2016 | Romano | |
| 9,767,165 B1 | 9/2017 | Tacchi | |
| 9,779,081 B2 | 10/2017 | Simard et al. | |
| 9,922,025 B2 | 3/2018 | Cross et al. | |

(Continued)

OTHER PUBLICATIONS

Devlin et al., "BERT: Pre-training of Deep Bidirectional Transformers for Language Understanding", Cornell University [online], Submitted Oct. 11, 2018, 16 pages.

(Continued)

*Primary Examiner* — George C Monikang
(74) *Attorney, Agent, or Firm* — KDW FIRM PLLC

(57) ABSTRACT

Learning frameworks for processing text transcripts may include receiving, by an application, a query comprising a topic. A topic model may determine a plurality of subtopics based on the topic. The application may receive, from a database based on the topic and plurality of subtopics, a plurality of text transcripts. A sentiment model may compute, for each text transcript, a respective sentiment score based on a text of the respective text transcript. The application may determine, for each text transcript, a duration of a communication session associated with the respective text transcript. The application may compute, for each text transcript, a total score based on the sentiment score and the duration of the respective text transcript. The application may return, as responsive to the query, a subset of the plurality of text transcripts having a total score that exceeds a threshold.

20 Claims, 8 Drawing Sheets

(56) References Cited

U.S. PATENT DOCUMENTS

| | | | |
|---|---|---|---|
| 10,754,883 B1 | | 8/2020 | Kannu |
| 11,023,675 B1* | | 6/2021 | Neervannan .......... G06F 3/0482 |
| 11,227,183 B1 | | 1/2022 | Connors et al. |
| 11,294,974 B1 | | 4/2022 | Shukla et al. |
| 2004/0210443 A1 | | 10/2004 | Kuhn |
| 2012/0259801 A1 | | 10/2012 | Ji |
| 2013/0346424 A1 | | 12/2013 | Zhang et al. |
| 2017/0353605 A1* | | 12/2017 | Dumaine ............. G06V 40/176 |
| 2018/0121539 A1 | | 5/2018 | Ciulla |
| 2019/0139551 A1 | | 5/2019 | Steelberg |
| 2019/0163817 A1 | | 5/2019 | Milenova |
| 2020/0302011 A1* | | 9/2020 | Mishra ................. G06F 40/242 |
| 2020/0410012 A1 | | 12/2020 | Moon |
| 2021/0089971 A1 | | 3/2021 | Grabau et al. |
| 2021/0097472 A1 | | 4/2021 | Inamdar et al. |
| 2021/0157990 A1 | | 5/2021 | Lima et al. |
| 2021/0158234 A1 | | 5/2021 | Sivasubramanian |
| 2022/0230116 A1* | | 7/2022 | Dubey ............. G06Q 10/06398 |
| 2022/0293107 A1 | | 9/2022 | Leaman |
| 2022/0318485 A1* | | 10/2022 | Narayanan ............ G06F 40/216 |
| 2022/0365955 A1 | | 11/2022 | Ramamohan |

OTHER PUBLICATIONS

Author Unknown, "Okapi BM25", Wikipedia the Free Encyclopedia [online], Retrieved from the Internet URL: <https://en.wikipedia.org/wiki/Okapi_BM25>, Retrieved on May 12, 2021, 4 pages.

Pagliardini et al., "Unsupervised Learning of Sentence Embeddings using Compositional n-Gram Features", NAACL 2018—Conference of the North American Chapter of the Association for Computational Linguistics, pp. 528-540.

Author Unknown, "DBSCAN", Wikipedia [online], Retrieved from Internet URL:<https://en.wikipedia.org/wiki/DBSCAN>, Retrieved on Dec. 14, 2021, 8 pages.

Author Unknown, "Sentiment analysis", Wikipedia [online], Retrieved from Internet URL:<https://en.wikipedia.org/wiki/Sentiment_analysis', Retrieved on Dec. 14, 2021, 16 pages.

Author Unknown, "How to Search Chat History", Published Jun. 3, 2021, Retrieved from Internet URL :<https://help.livehelpnow.net/1/kb/article/1584/how-to-search-chat-history>, Retrieved on Dec. 14, 2021, 2 pages.

Author Unkown, "Transcripts—Accessing transcripts", Olark [online], Retrieved from Internet URL:<https://www.olark.com/help/view-transcripts/>, Retrieved on Dec. 14, 2021, 8 pages.

Gildea et al., "Topic-based Language Models using EM", Proc. 6th European Conference on Speech Communication and Technology (Eurospeech 1999), 2167-2170, doi: 10.21437/Eurospeech. 1999-479.

Levine et al., "PMI-Masking: Principled Masking of Correlated Spans", arXiv:2010.01825v1 [cs.LG] Oct. 5, 2020 https://doi.org/10.48550/arXiv.2010.01825.

* cited by examiner

LEARNING FRAMEWORK FOR PROCESSING COMMUNICATION SESSION TRANSCRIPTS

CROSS-REFERENCE TO RELATED APPLICATIONS

This application is related to co-pending U.S. application Ser. No. 17/554,606, entitled "IDENTIFYING ZONES OF INTEREST IN TEXT TRANSCRIPTS USING DEEP LEARNING," filed on Dec. 17, 2021, which is hereby incorporated by reference in its entirety.

BACKGROUND

Often, users contact customer support agents for assistance. Agents may assist these users with various issues during these interactions. One or more text transcripts may be generated based on the interactions and stored for future use. The agents may also summarize the interactions in the form of agent notes. However, these transcripts and/or agent notes often have acronyms, shorthand notation, and varying word choices, making conventional solutions ineffective for searching. Furthermore, the transcripts often lack correct grammatical structure, punctuation, and other attributes that further exacerbate the difficulty in searches. Therefore, specific customer experiences may be difficult to identify in the transcripts.

BRIEF SUMMARY

In one aspect, a method, includes receiving, by an application executing on a processor, a query comprising a topic, determining, by a topic model executing on the processor, a plurality of subtopics based on the topic, receiving, by the application from a database based on the topic and plurality of subtopics, a plurality of text transcripts, computing, by a sentiment model executing on the processor for each text transcript, a respective sentiment score based on a text of the respective text transcript, determining, by the application for each text transcript, a duration of a customer support session associated with the respective text transcript, computing, by the application for each text transcript, a total score based on the sentiment score and the duration of the respective text transcript, and returning, by the application as responsive to the query, a subset of the plurality of text transcripts having a total score that exceeds a threshold.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 illustrates an aspect of the subject matter in accordance with one embodiment.

FIG. 4 illustrates an aspect of the subject matter in accordance with one embodiment.

DETAILED DESCRIPTION

Figure 1:
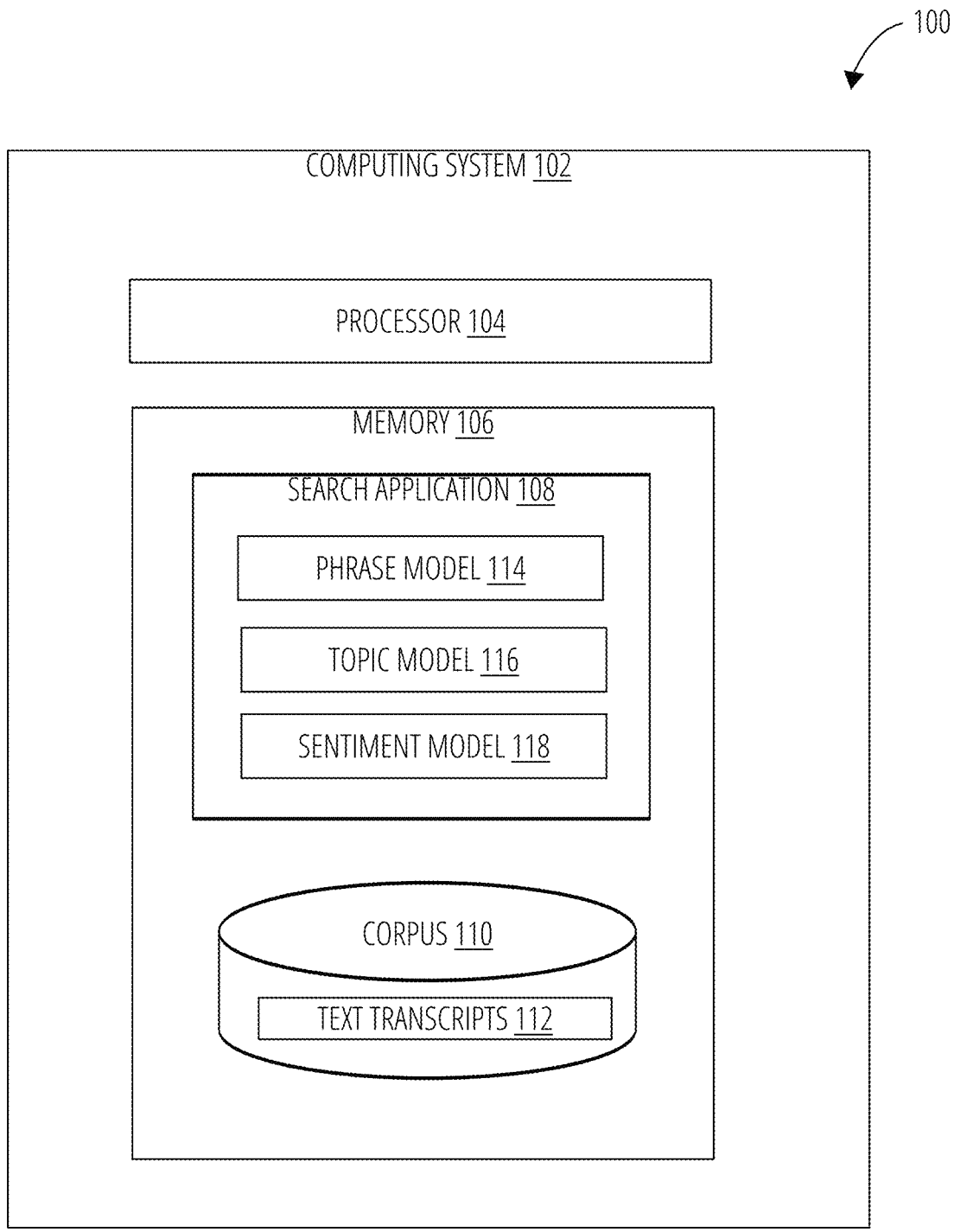
FIG. 1 illustrates an aspect of the subject matter in accordance with one embodiment.

Embodiments disclosed herein provide a deep learning framework for processing text transcripts of communication sessions between users and customer support agents. Generally, some users may have suboptimal experiences with a product or service and contact customer support agents for assistance. Embodiments disclosed herein may identify these customers and the details of the issues affecting the customers using a deep learning framework. By identifying these customers, different processes, products, and/or services may be repaired and/or improved.

More generally, embodiments disclosed herein may provide a search tool that allows users to search the transcripts to view one or more transcripts matching an input query. Furthermore, embodiments disclosed herein may leverage a phrase model that is trained using unsupervised learning algorithms to automatically extract key phrases that summarize discussion points in a given customer support session. By extracting these phrases, queries can be supplemented with these terms to return more relevant results from the transcripts.

Further still, embodiments disclosed herein may train a topic model using semi-supervised techniques. The topic model may generally be used to classify customer support sessions based on words in the transcript. The topic model may be trained based at least in part on the phrases extracted by the phrase model. During training, the topic model may generate a plurality of different topics. The trained topic model may then cluster an input transcript into one of the plurality of topics. To identify customers having suboptimal experiences, embodiments disclosed herein may compute a score for each of the customer support sessions based on a respective transcript. The score may be based on a sentiment score for each transcript, where the sentiment score is computed by a sentiment model. The score may be further based on a duration of the call, how long the user was on hold during the call, and how long the customer spoke to an agent during the call. Transcripts having a score that exceeds a predetermined threshold may be returned. Generally, if the score exceeds the threshold, the customer may be having a suboptimal experience, and a solution may be determined based on the transcript. For example, by analyzing the transcripts, embodiments disclosed herein may identify a customer who is having difficulty using an online service. By analyzing the customer's support transcript, embodiments disclosed herein may identify an outage or other error that is impacting the online service. Embodiments disclosed herein may then generate a notification that is transmitted to the relevant personnel to correct the error and restore the functionality of the online service.

Conventional solutions may involve manual an ad-hoc analysis to identify customers having suboptimal experiences and/or identify the issues that are leading to customer complaints. For example, a user may have to listen to audio call logs and/or read text transcripts for thousands or more calls to identify a problem. Furthermore, there are no standard techniques available to prioritize efforts and obtain accurate sizing of the issues. Advantageously, embodiments disclosed herein may return more accurate results from an unstructured corpus of text. Doing so may allow for more accurate identification of problems, such as system outages, process errors, and the like. Further still, embodiments disclosed herein allow users to easily identify issues affecting customers, even if very few customers are affected by these issues. Furthermore, these issues may be in any line of business and/or domain, allowing the relevant users to estimate the impact of the issues.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a computer as selectively activated or reconfigured by a computer program stored in the computer. The procedures presented herein are not inherently related to a particular computer or other apparatus. Various computing machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 123 illustrated as components 123-1 through 123-a (or 123a) may include components 123-1, 123-2, 123-3, 123-4, and 123-5. The embodiments are not limited in this context.

FIG. 1 depicts a schematic of an exemplary system 100, consistent with disclosed embodiments. As shown, the system 100 includes at least one computing system 102. The computing system 102 comprises at least a processor 104 a memory 106. As shown, the memory 106 includes a search application 108 and a corpus 110. The computing system 102 is representative of any type of computing system or device, such as a server, compute cluster, cloud computing environment. virtualized computing system, and the like. The search application 108 is representative of any type of database management system (DBMS), search platform, search engine, or other application for receiving a query as input and returning one or more results from the corpus 110 as responsive to the query.

The corpus 110 is a corpus of a plurality of text transcripts 112 of communications (e.g., phone calls, online text-based chat sessions, etc.) between one or more customer service agents and one or more users in a communication session (also referred to as a customer support session). The text transcripts 112 may generally include all communications exchanged during the communication session. If the original conversation is audio-based, the text transcript 112 for the conversation may be generated based on a speech-to-text algorithm, or any other technique for generating text based on speech. Each text transcript 112 may further include notes or other text added by the agent during and/or after the support session. Therefore, because different parties are involved, the text transcripts 112 may vary in terminology used, the use of punctuation, grammatical structure, and the like. Stated differently, the text of the text transcripts 112 may be unstructured. For example, customers A and B may speak with agents Y and Z, respectively, regarding a credit increase. However, agent Y may use the term "credit increase" while agent Z may use the term "credit lift." Therefore, a search query processed by conventional search platforms may not return both results (e.g., if the query specifies "credit lift", the text transcript 112 associated agent Y may not be returned, as "credit lift" may not match "credit increase".). Advantageously, however, the search application 108 may return more accurate results as described in greater detail herein.

As shown, the search application 108 includes a phrase model 114, a topic model 116, and a sentiment model 118. The phrase model 114, topic model 116, and sentiment model 118 may be any type of computing model, such as a machine learning model, neural network, classifiers, and the like. The phrase model 114 is trained to extract phrases (or topics) which reflect the main discussion points of a communication session. The phrase model 114 may be trained based on a training dataset of text transcripts (not pictured) from a plurality of different communication sessions. In some embodiments, the phrase model 114 is trained using unsupervised training algorithms. Once trained, the phrase model 114 may process a text transcript 112 and return one or more "key" phrases present in the text transcript 112. For example, given a text transcript 112 associated with a customer who suffered loss due to a hurricane, the phrase model 114 may return "hurricane", "flood", and "damage" as the top 3 phrases present in the text transcript 112.

The topic model 116 is a classification model that may classify text into one or more topic clusters. The text classified by the topic model 116 may include queries submitted by users, the text transcripts 112, and/or the topics (or phrases) outputted by the phrase model 114. The topic clusters may be generated during an unsupervised training of the topic model 116, e.g., using an unsupervised training algorithm such as the dbscan clustering algorithm. In some embodiments, the topic clusters generated during training may be manually assigned labels based on cluster information. In at least one embodiment, the topic model 116 is trained based on a plurality of topics generated by the phrase model 114 processing the plurality of text transcripts 112. The topics generated by the phrase model 114 may therefore include the most prevalent topics, or phrases, present in the corpus 110. During training of the topic model 116, the topic model 116 may highlight new clusters (e.g., previously unknown topics), allowing users to discover new topics. For example, the trained topic model 116 may associate the topic "automobile" with the topic "vehicle."

Once trained, the topic model 116 may process a text transcript 112 and cluster the text transcript 112 into one or more of the topics. For example, if a user discusses vehicle loan payments in a text transcript 112, the topic model 116 may cluster the text transcript 112 into at least the "automobile" topic cluster. Furthermore, the topic model 116 may be used to generate "subtopics" for the topics generated by the phrase model. For example, in some embodiments, the topic model 116 may again process the text transcripts 112 using a given topic to generate related subtopics. During this additional processing, the topic model 116 will produce new key phrase clusters (e.g., subtopics associated with the given topic). Therefore, if the phrase model 114 generates "outage" as a topic, the topic model 116 may reprocess the text transcripts 112 using the "outage" topic and return "network connection" as a new key phrase cluster as a subtopic. Doing so allows queries and/or other searches to be expanded to include more relevant results from the text transcripts 112.

For example, a user may submit a query with the term "hurricane." In at least one embodiment, the phrase model 114 and/or topic model 116 may analyze the query to identify the topic "hurricane" in the query. The topic model 116 may then cluster the topic "hurricane" and return the subtopics "storm" and "disaster". In addition and/or alternatively, the topic model 116 may process the text of the query, thereby classifying (or clustering) the query into one or more topic clusters. The topic model 116 may then return one or more subtopics related to the one or more topic clusters. Regardless of the technique used, the additional terms may be added to the query (e.g., adding subtopics "storm" and "disaster") to return more results from the corpus 110.

The sentiment model 118 is a natural language processing model that is configured to detect sentiment in the text of the text transcripts 112. For example, by processing a text transcript 112, the sentiment model 118 may detect "frustration" as a sentiment expressed by the user. As discussed in greater detail herein, the sentiment model 118 may further compute a sentiment score for the text transcript 112. The sentiment score may generally reflect whether negative sentiment is detected by the sentiment model 118 in a given text transcript 112.

As stated, searching the corpus 110 may return few or no results due to the limitations of conventional techniques. For example, one user may be experiencing a suboptimal experience with a payment portal due to a technical error in a source code of the payment portal. However, because only one user is affected, a search of the text transcripts 112 may not reveal the problem. Advantageously, however, the system 100 is configured to identify these and other problems.

In some embodiments, to identify customers having suboptimal experiences, the search application 108 (or a component thereof, such as the sentiment model 118) may compute a total score for each respective text transcript 112. In some embodiments, a user may provide a search query to the search application 108 to identify customers having suboptimal experiences (e.g., a search query for "payment problems", "account opening", etc.). However, in other embodiments, no initial search query is provided, and the search application 108 returns all customers having suboptimal experiences regardless of the associated issues.

If a search query is provided, the search application 108 may process the query to return an initial set of text transcripts 112 matching the query. Furthermore, the phrase model 114 may process the initial set of text transcripts 112 to extract a predetermined number of key phrases present in the set of text transcripts 112. The phrase model 114 may then output the extracted key phrases for display in a graphical user interface (GUI) of the search application 108. A user may then select one or more key phrases via the user interface, which may return the text transcripts 112 having the highest total score computed by the search application 108. In some embodiments, the key phrases may include one or more subtopics returned by the topic model 116 based on the key phrases generated by the phrase model 114. For example, the "payment" topic may be generated by the phrase model 114, and the topic model 116 may generate a "website error" subtopic based on the "payment" topic (and/or other topics generated by the phrase model 114). The topic model 116 may generally determine the subtopics by clustering, or classifying, each phrase (or topic) generated by the phrase model 114, into a given topic. The topic model 116 may then return one or more subtopics associated with the topic into which the phrase (or topic) generated by the phrase model 114 is classified into.

In some embodiments where a search query is provided, the topic model 116 and/or the phrase model 114 may process the query to identify one or more topics therein. The topic model 116 may then supplement the query with the identified topics. Furthermore, the phrase model 114 may return one or more subtopics related to the identified topics and/or the search query. The search application 108 may then process the original query with the additional topics and/or subtopics to return a result set of text transcripts 112. The search application 108 may then compute a total score for each text transcript 112 in the result set.

If a search query is not provided, the phrase model 114 may process the text transcripts 112 to identify the predetermined number of key phrases (or topics) present in the text transcripts 112. In some embodiments, the phrase model 114 returns the topics that were previously determined and stored. In some embodiments, the phrase model 114 may then output the extracted topics for display in the GUI of the search application 108. A user may then select one or more topics via the user interface. The topic model 116 may then process the selected topic and return one or more subtopics related to the topics. The search application 108 may then generate and submit a query including the selected topics and any subtopics, which may return text transcripts 112 matching the selected topics and/or subtopics. The search application 108 may then score the text transcripts 112 as described herein, and return the text transcripts 112 having the highest total score computed by the search application 108.

In other embodiments where a query is not provided, the key phrases are not outputted for display. In such embodiments, the phrase model 114 returns the predetermined number of key phrases (or topics) present in the text transcripts 112. The topic model 116 may then process the topics returned by the phrase model 114 to return one or more subtopics based on the topics. The search application 108 may then generate and submit a query including the selected topics and any subtopics, which may return text transcripts 112 matching the selected topics and/or subtopics. The search application 108 may then score the text transcripts 112 as described herein, and return the text transcripts 112 having the highest total score computed by the search application 108.

To compute the total score for a given text transcript 112, the sentiment model 118 may compute a sentiment score based on the text of the text transcript 112. The sentiment score may generally reflect whether negative sentiment is present (e.g., whether a user is expressing negative sentiment such as anger, frustration, etc.) in the text transcript 112. The sentiment model 118 may compute the sentiment score based at least in part on a number of statements associated with negative sentiment, where a greater number of statements associated with negative sentiment produces a greater sentiment score.

The search application 108 may then determine, for each text transcript 112, a duration of the communication session, an amount of time the user spent waiting to communicate with an agent (also referred to as an amount of hold time), and an amount of time the user communicated with an agent. Such time attributes may be stored as metadata of each text transcript 112. The search application 108 may then compute a total time score based on the duration of the communication session, the amount of hold time, and the amount of time the user communicated with the agent. In at least one embodiment, the total time score is based on respective weights applied to the duration of the communication session, the amount of hold time, and the amount of time the user communicated with the agent. For example, the amount of hold time may be used to compute a first time score and the amount of time the user communicated with the agent may be used to compute a second time score. The first and second time scores may be used to compute the total time score. For example, the first time score may be based on a ratio of hold time to total duration, while the second time score may be based on a ratio of the communication time to total duration. Furthermore, one or more weights may be applied to each computed ratio. However, any other suitable technique to compute the time scores may be used.

The search application 108 may then compute the total score for a given text transcript 112 based on the sentiment score and the total time score. Generally, a higher total score may reflect a higher level of customer frustration. Therefore, if a customer is on hold for a long period of time and communicates with an agent for a short period of time, the search application 108 may compute a relatively high total score for the associated text transcript 112. If, however, the customer is on hold for a short period of time and communicates with an agent for a long (or short) period of time, the search application 108 may compute a relatively low total score for the associated text transcript 112.

In at least one embodiment, the search application 108 computes the total score based on summing the sentiment score and the total time score. In some embodiments, the search application 108 applies weights to the sentiment score and/or the total time score to compute the total score. The search application 108 may then compare each total score to a predetermined threshold, and return the text transcripts 112 having total scores that exceed the threshold. For example, if the threshold total score is 8.0 on a range of 0.0-9.0 for total scores, the search application 108 returns text transcripts 112 having scores greater than (or equal to) 8.0. The search application 108 may then output the text transcripts 112 (and/or indications of the text transcripts 112) having total scores that exceed the threshold for display.

Furthermore, for each returned text transcript 112 having a total score that exceeds the threshold, the search application 108 may determine a system error or other problem that is causing the customer to have a suboptimal experience. For example, if the top 3 total scores are related to payment processing errors (e.g., based on natural language processing of the corresponding text transcripts 112), the search application 108 may generate an indication specifying that the payment processing system is experiencing errors and transmit the indication to one or more responsible personnel via a network. The indication may include the topics generated by the phrase model 114 and/or topic model 116. The indication may further include portions of text transcripts 112 that are associated with the topics. Doing so may allow personnel to correct the error with the payment processing system to restore proper functionality.

Figure 2:
FIG. 2 illustrates an aspect of the subject matter in accordance with one embodiment.

FIG. 2 is a schematic illustrating a GUI 200 of the search application 108, according to various embodiments. As shown, the GUI 200 includes a search interface 202 which allows a user to submit a query. As shown, the query generally specifies to search for customers affected by the COVID-19 pandemic. Advantageously, the search application 108 may process the query to return a set of results 208 that reflects customers having a total score (labeled as a "frustration score" in FIG. 2) that is greater than a threshold of 7 on a scale from 0-9. The threshold may be specified via the total score filter 204.

In some embodiments, the phrase model 114 and/or the topic model 116 may process the query to identify one or more topics in the query. Doing so allows the search application 108 to generate one or more topic filters 206 that allows users to filter search results based on the identified topics. The topic filters 206 may include a list of selectable topics. Furthermore, the topic model 116 may process the query to cluster the query into one or more topic clusters. By doing so, the topic model 116 may identify one or more subtopics that are related to one or more topics in the query. The search application 108 may then generate a sub-topic filter 210 that allows users to filter search results based on the identified subtopics. The search application 108 may process the query against the corpus 110 to return one or more results matching one or more terms of the query. Furthermore, the search application 108 may supplement the query with one or more topics generated by the phrase model 114 and one or more subtopics generated by the topic model 116. Doing so may return an initial result set including one or more text transcripts 112. By adding the topics and subtopics to the query, the search application 108 may return a greater number of results in the initial result set relative to processing the query without the topics and/or subtopics.

The sentiment model 118 may then compute a sentiment score for each text transcript 112 in the initial result set. As stated, the sentiment model 118 may generally identify instances of negative sentiment in the text transcript 112 and compute the score based on the number of instances of negative sentiment. The sentiment model 118 may further consider other factors, such as instances of positive sentiment, instances of neutral sentiment, or any other suitable factor. Generally, the sentiment model 118 returns a higher sentiment score for text transcripts 112 with greater overall negative sentiment than text transcripts 112 with lower overall negative sentiment.

The search application 108 may then determine a duration of the communication session associated with each text transcript 112. The search application 108 may further determine an amount of time the customer interacted (e.g., spoke with on a phone call, chatted with in an online chat) with a customer support agent. The search application 108 may also determine an amount of time the customer was on hold (e.g., was not interacting with an agent). The search application 108 may then compute a total score for the text transcript 112 based on the sentiment score, the amount of time the customer interacted with an agent, and the amount of hold time.

The search application 108 may then filter the text transcripts 112 from the initial result set that do not have a total score that exceeds a threshold. Therefore, as shown, each displayed entry in the results 208 includes a total score of 7, 8, or 9. A user (e.g., a customer support agent) may select a given result in the results 208 to view additional information related to the customer support session.

Furthermore, the search application 108 may identify one or more errors or other issues that require resolution based on the results 208. For example, based on the results 208, the search application 108 may determine that a network outage has affected a payment portal. The search application 108 may then generate a notification describing the network outage (and optionally including any of the results 208) and transmit the notification to associated personnel who may review the results 208 and identify a corrective action. For example, upon receiving the notification, a system administrator may identify the network outage and perform one or more corrective actions to restore the network and the payment portal. Embodiments are not limited in these contexts.

Figure 3:
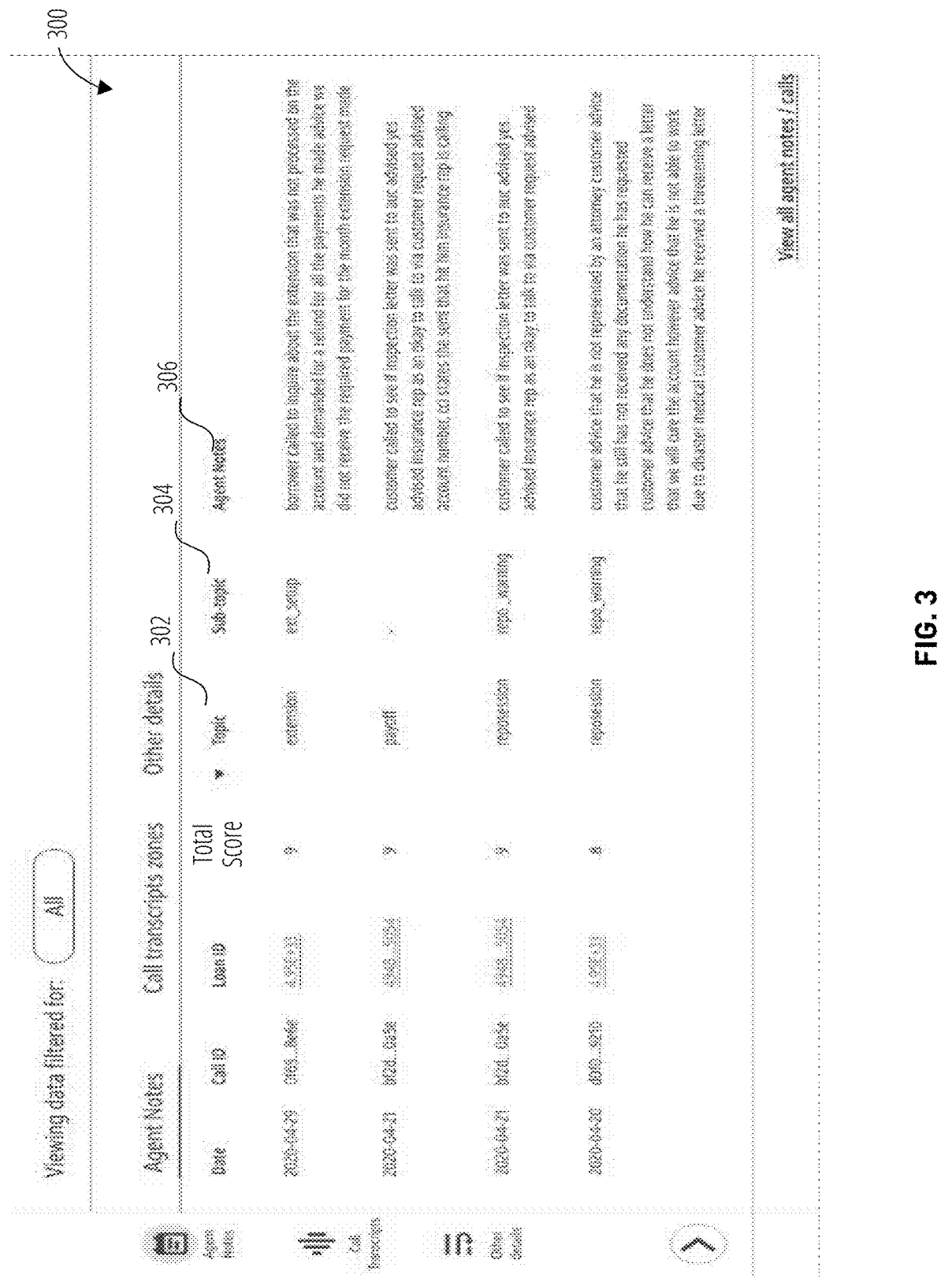

FIG. 3 is a schematic illustrating a GUI 300 of the search application 108, according to various embodiments. Generally, the GUI 300 reflects a more refined interface that allows filtering of text transcripts 112 that exceed the threshold total score, e.g., the results 208 of FIG. 2. As shown, for each result, the GUI 300 includes a column 302 for topics, a column 304 for subtopics, and a column 306 for agent notes generated by the agent who communicated with the customer. For example, the first result in the GUI 300 includes the topic of "extension," while the subtopic is "ext_setup", which may be related to establishing an extension for the customer. The agent notes indicate that the customer was indeed requesting an extension for payments.

Figure 4:
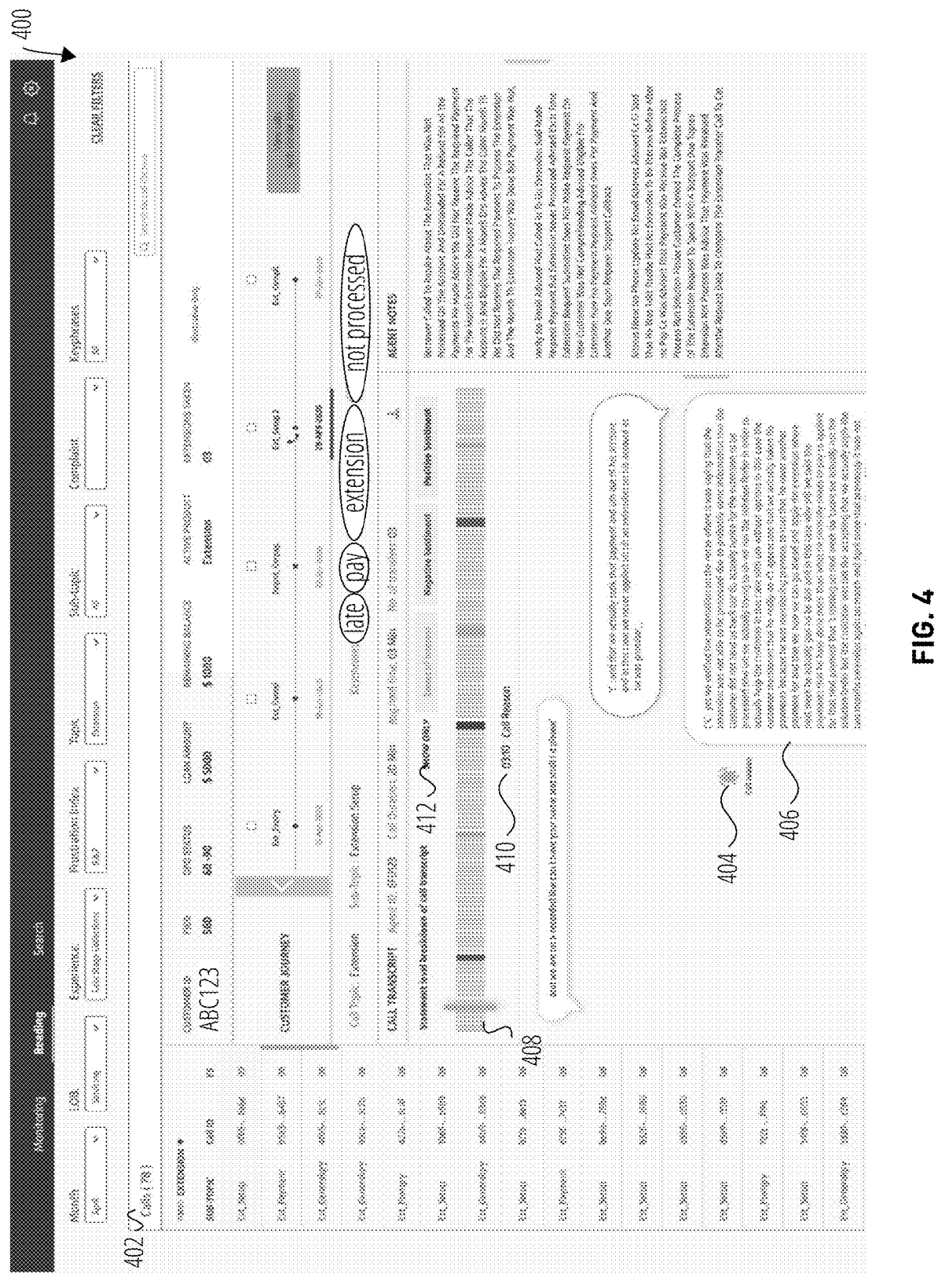

FIG. 4 is a schematic illustrating a GUI 400 of the search application 108, according to various embodiments. As shown, a plurality of text transcripts 112 may be displayed in the GUI 400. The text transcripts 112 may include the results 208 that have been filtered according to various criteria. For example, as shown, the user has specified to filter by month (e.g., April), a line of business (LOB) of "servicing," a customer experience of "late stage collections", text transcripts 112 having a total score from 7-9, and the topic of "extension."

Details of a selected text transcript 112 may include a call reason indicator 404 generated by the search application 108. The call reason indicator 404 may be associated with a text segment 406 that reflects a reason for the communication session associated with the selected text transcript 112. The reason may be determined by the search application 108 using natural language processing and deep learning techniques. The call reason may further be highlighted in a timeline 408 at timeline position 410. Advantageously, filters 412 allow the user to select specific areas of interest, which causes statements from the text transcript 112, such as the statement in the text segment 406, to be displayed in the GUI 400.

Figure 5:
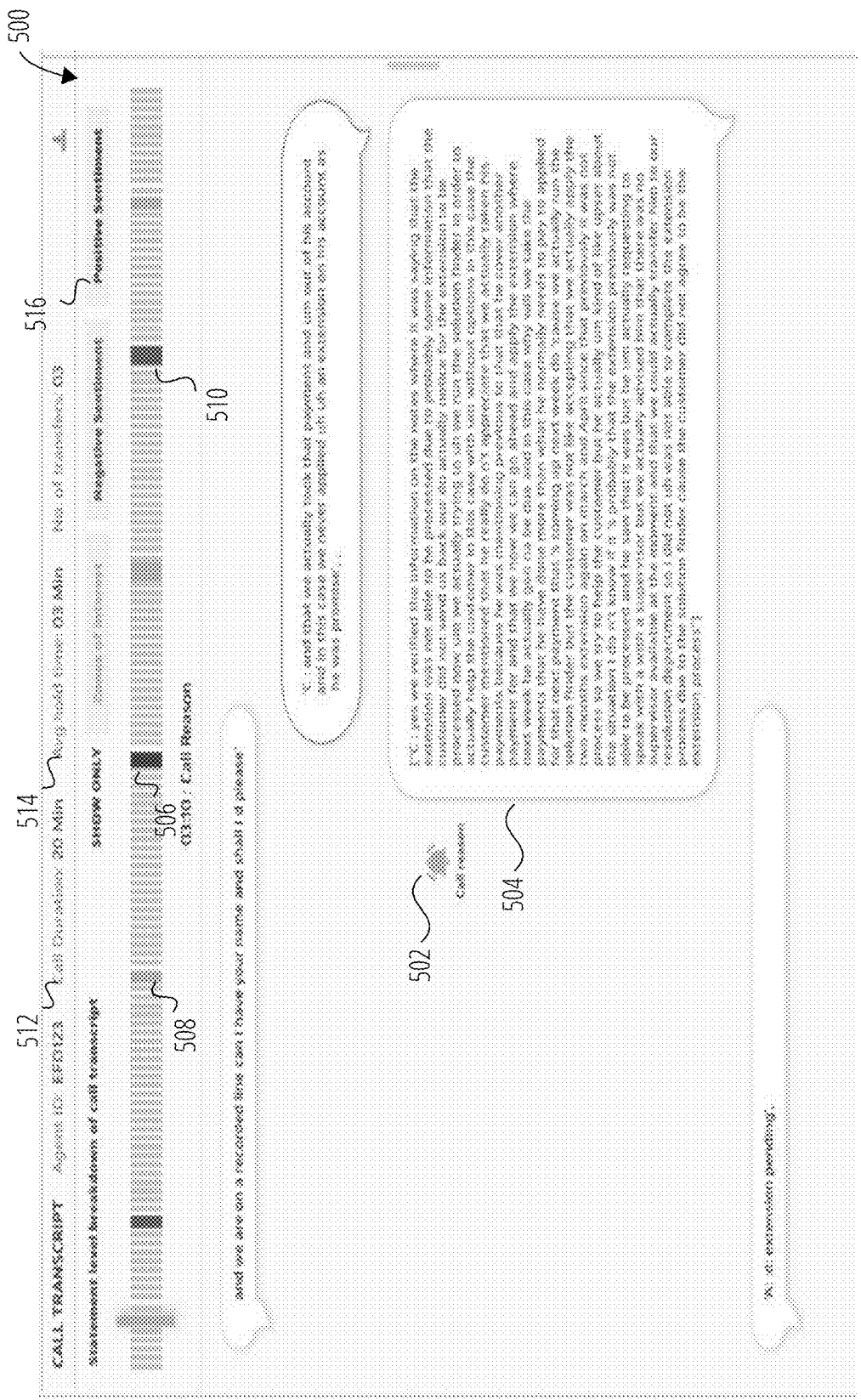
FIG. 5 illustrates an aspect of the subject matter in accordance with one embodiment.

FIG. 5 is a schematic illustrating a GUI 500 of the search application 108, according to various embodiments. As shown, the GUI 500 includes a more detailed view of one or more statements in a selected text transcript 112. For example, the GUI 500 reflects a call duration 512 and the amount of hold time 514 the customer spent waiting on hold. Furthermore, the GUI 500 includes a highlight 502, which may be any type of graphical indicator, that is associated with a call reason segment 504 from the text transcript 112. The call reason 504 may be displayed based on selection of the timeline element 506. Other statements may be displayed based on selection of other timeline elements, such as elements 508 and 510. The elements 508, 510, may be associated with specific interests, such as statements of negative sentiment, statements of positive sentiment, and/or the call reason.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

Figure 6:
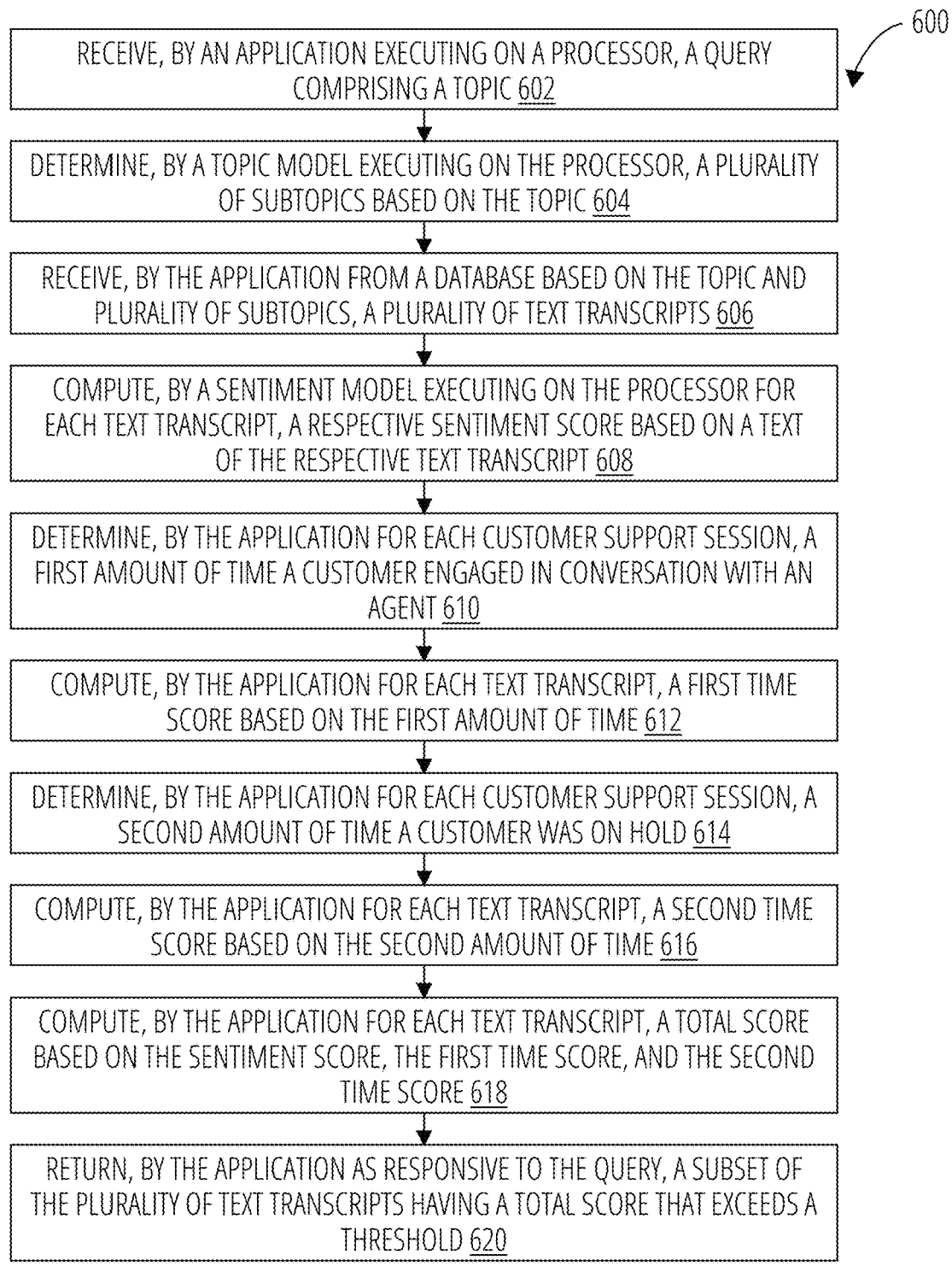
FIG. 6 illustrates a routine 600 in accordance with one embodiment.

FIG. 6 illustrates an embodiment of a logic flow, or routine, 600. The logic flow 600 may be representative of some or all of the operations executed by one or more embodiments described herein. For example, the logic flow 600 may include some or all of the operations for searching text transcripts 112 to identify customers having suboptimal experiences. Embodiments are not limited in this context.

In block 602, routine 600 receives, by the search application 108 executing on a processor, a query comprising a topic. The topic may be determined by the phrase model 114. In block 604, routine 600 determines, by a topic model 116 executing on the processor, a plurality of subtopics based on the topic. In block 606, routine 600 receives, by the search application 108 from a database (e.g., the corpus 110) based on the topic and plurality of subtopics, a plurality of text transcripts 112. In block 608, routine 600 computes, by a sentiment model executing on the processor for each text transcript 112, a respective sentiment score based on a text of the respective text transcript 112.

In block 610, routine 600 determines, by the application for each communication session, a first amount of time a customer engaged in conversation with an agent. In block 612, routine 600 computes, by the application for each text transcript 112, a first time score based on the first amount of time. In block 614, routine 600 determines, by the application for each communication session, a second amount of time a customer was on hold. In block 616, routine 600 computes, by the application for each text transcript 112, a second time score based on the second amount of time. In block 618, routine 600 computes, by the application for each text transcript 112, a total score based on the sentiment score, the first time score, and the second time score. In block 620, routine 600 returns, by the application as responsive to the query, a subset of the plurality of text transcripts 112 having a total score that exceeds a threshold.

Figure 7:
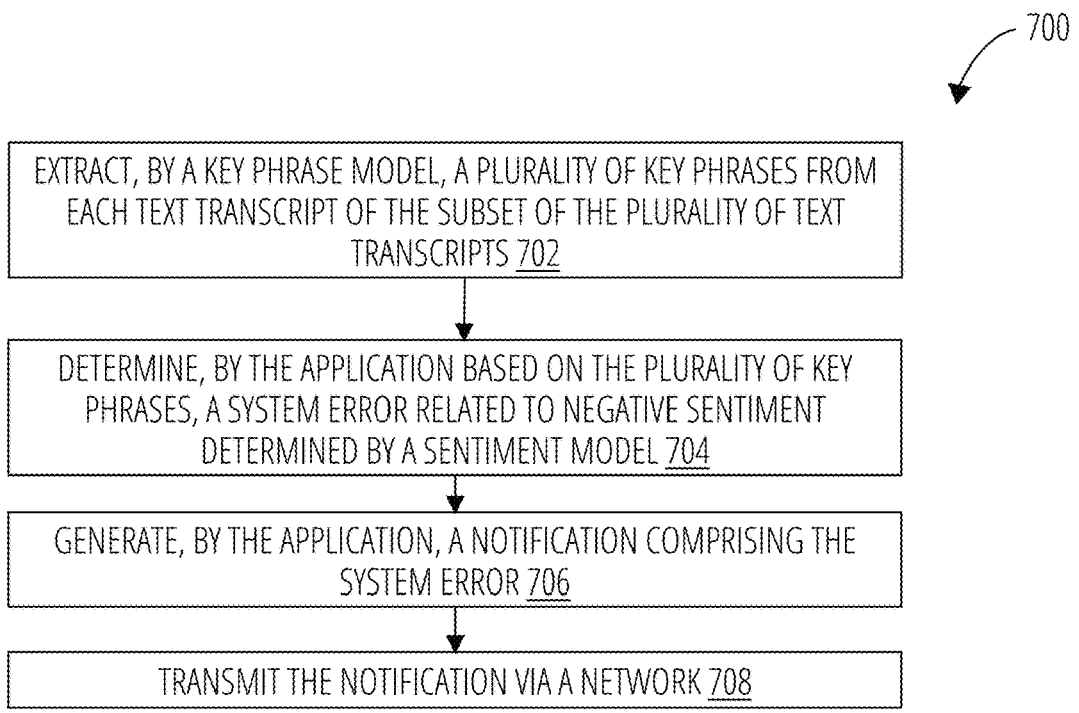
FIG. 7 illustrates a routine 700 in accordance with one embodiment.

FIG. 7 illustrates an embodiment of a logic flow, or routine, 700. The logic flow 700 may be representative of some or all of the operations executed by one or more embodiments described herein. For example, the logic flow 700 may include some or all of the operations for searching text transcripts 112 to identify customers having suboptimal experiences and perform a corrective action. Embodiments are not limited in this context.

In block 702, routine 700 extracts, by a phrase model 114, a plurality of key phrases from each text transcript 112 of the subset of the plurality of text transcripts 112 (e.g., the subset returned at block 620). In block 704, routine 700 determines, by the search application 108 based on the plurality of key phrases, a system error related to negative sentiment determined by the sentiment model 118. In block 706, routine 700 transmits, by the search application 108, a notification comprising the system error via a network.

Figure 8:
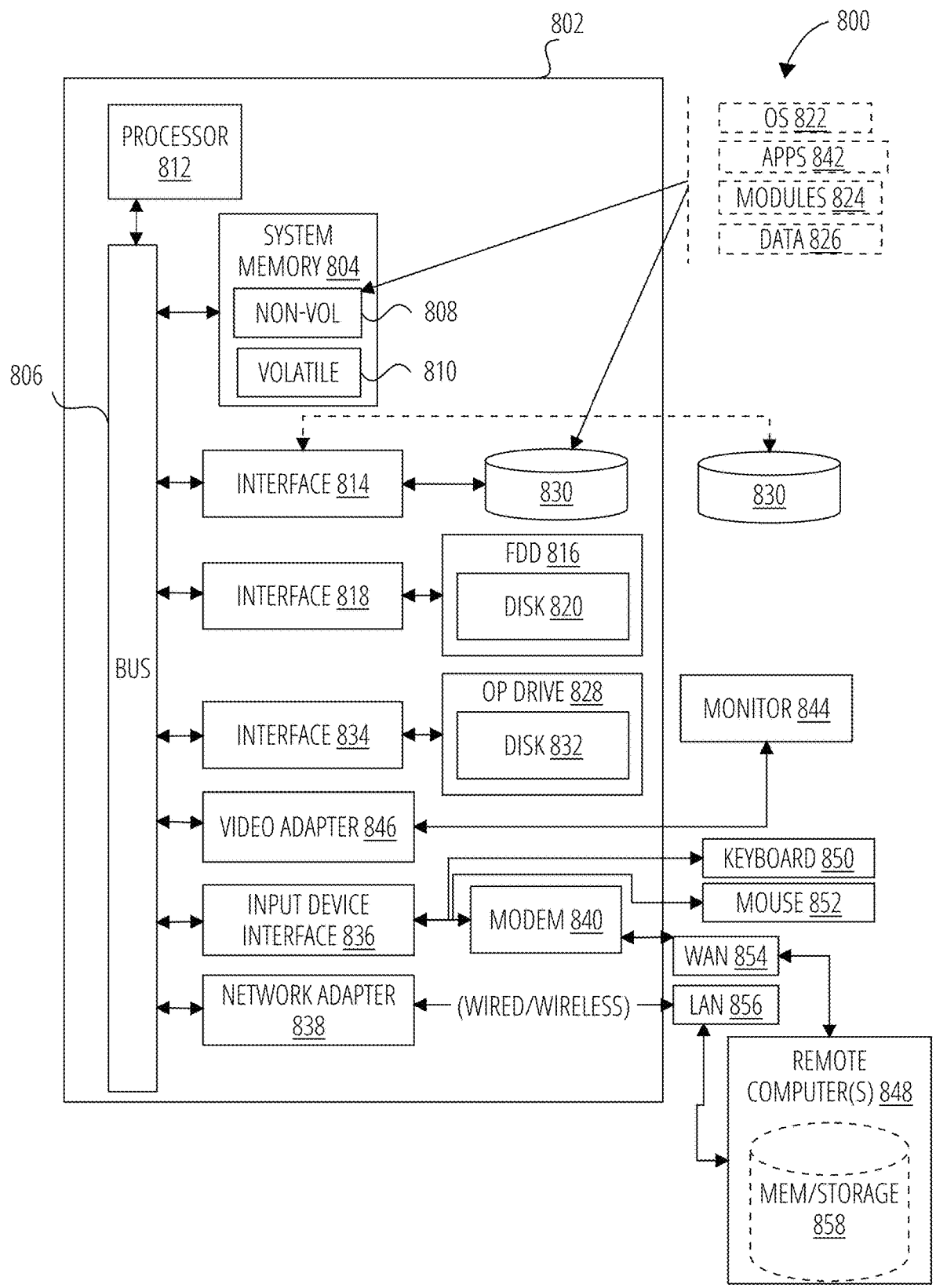
FIG. 8 illustrates a computer architecture 800 in accordance with one embodiment.

FIG. 8 illustrates an embodiment of an exemplary computer architecture 800 including a computer 802 suitable for implementing various embodiments as previously described. In various embodiments, the computer architecture 800 may include or be implemented as part of system the computing system 102.

As used in this application, the terms "system" and "component" are intended to refer to a computer-related entity, either hardware, a combination of hardware and software, software, or software in execution, examples of which are provided by the exemplary computing computer architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computer architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computer architecture 800.

As shown in FIG. 8, the computer 802 includes a processor 812, a system memory 804 and a system bus 806. The processor 812 can be any of various commercially available processors.

The system bus 806 provides an interface for system components including, but not limited to, the system memory 804 to the processor 812. The system bus 806 can be any of several types of bus structure that may further interconnect to a memory bus (with or without a memory controller), a peripheral bus, and a local bus using any of a variety of commercially available bus architectures. Interface adapters may connect to the system bus 806 via slot architecture. Example slot architectures may include without limitation Accelerated Graphics Port (AGP), Card Bus, (Extended) Industry Standard Architecture ((E) ISA), Micro Channel Architecture (MCA), NuBus, Peripheral Component Interconnect (Extended) (PCI (X)), PCI Express, Personal Computer Memory Card International Association (PCMCIA), and the like.

The computer architecture 800 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 804 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 804 can include non-volatile 808 and/or volatile 810. A basic input/output system (BIOS) can be stored in the non-volatile 808.

The computer 802 may include various types of computer-readable storage media in the form of one or more lower speed memory units, including an internal (or external) hard disk drive 830, a magnetic disk drive 816 to read from or write to a removable magnetic disk 820, and an optical disk drive 828 to read from or write to a removable optical disk 832 (e.g., a CD-ROM or DVD). The hard disk drive 830, magnetic disk drive 816 and optical disk drive 828 can be connected to system bus 806 by an HDD interface 814, and FDD interface 818 and an optical disk drive interface 834, respectively. The HDD interface 814 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 808, and volatile 810, including an operating system 822, one or more applications 842, other program modules 824, and program data 826. In various embodiments, the one or more applications 842, other program modules 824, and program data 826 can include, for example, the various applications and/or components of the system 102.

A user can enter commands and information into the computer 802 through one or more wire/wireless input devices, for example, a keyboard 850 and a pointing device, such as a mouse 852. Other input devices may include microphones, infra-red (IR) remote controls, radio-frequency (RF) remote controls, game pads, stylus pens, card readers, dongles, fingerprint readers, gloves, graphics tablets, joysticks, keyboards, retina readers, touch screens (e.g., capacitive, resistive, etc.), trackballs, track pads, sensors, styluses, and the like. These and other input devices are often connected to the processor 812 through an input device interface 836 that is coupled to the system bus 806 but can be connected by other interfaces such as a parallel port, IEEE 1394 serial port, a game port, a USB port, an IR interface, and so forth.

A monitor 844 or other type of display device is also connected to the system bus 806 via an interface, such as a video adapter 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all the elements described relative to the computer 802, although, for purposes of brevity, only a memory and/or storage device 858 is illustrated. The logical connections depicted include wire/wireless connectivity to a local area network 856 and/or larger networks, for example, a wide area network 854. Such LAN and WAN networking environments are commonplace in offices and companies, and facilitate enterprise-wide computer networks, such as intranets, all of which may connect to a global communications network, for example, the Internet.

When used in a local area network 856 networking environment, the computer 802 is connected to the local area network 856 through a wire and/or wireless communication network interface or network adapter 838. The network adapter 838 can facilitate wire and/or wireless communications to the local area network 856, which may also include a wireless access point disposed thereon for communicating with the wireless functionality of the network adapter 838.

When used in a wide area network 854 networking environment, the computer 802 can include a modem 840, or is connected to a communications server on the wide area network 854 or has other means for establishing communications over the wide area network 854, such as by way of the Internet. The modem 840, which can be internal or external and a wire and/or wireless device, connects to the system bus 806 via the input device interface 836. In a networked environment, program modules depicted relative to the computer 802, or portions thereof, can be stored in the remote memory and/or storage device 858. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-8 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method, comprising:
   receiving, by an application executing on a processor, a query comprising a topic;
   determining, by a topic model executing on the processor, a plurality of subtopics based on the topic;
   receiving, by the application from a database based on the topic and plurality of subtopics, a plurality of text transcripts, each transcript associated with a respective communication session;
   computing, by a sentiment model executing on the processor for each text transcript, a respective sentiment score based on a text of the respective text transcript;
   determining, by the application for each text transcript, a duration of the communication session associated with the respective text transcript;
   computing, by the application for each text transcript, a total score based on the sentiment score and the duration of the respective communication session;
   returning, by the application as responsive to the query, a subset of the plurality of text transcripts having a total score that exceeds a threshold;
   extracting, by a key phrase model, a plurality of key phrases from each text transcript of the subset of the plurality of text transcripts;
   determining, by the application and based on content of the plurality of key phrases, a system error associated with the application; and
   transmitting, by the application, a notification including the system error to a computing device to address the system error.

2. The method of claim 1, further comprising:
   determining, by the application for each communication session, a first amount of time a customer engaged in conversation with an agent;
   computing, by the application for each text transcript, a first time score based on the first amount of time;
   determining, by the application for each communication session, a second amount of time a customer was on hold; and
   computing, by the application for each text transcript, a second time score based on the second amount of time, wherein the total score is further based on the first and second time scores.

3. The method of claim 2, wherein computing the total score comprises computing a sum of the sentiment score, the first time score, and the second time score.

4. The method of claim 1, further comprising:
   outputting, by the application, the plurality of key phrases for display.

5. The method of claim 1,
   wherein the notification includes the topic determined from the topic model and one or more portions of the plurality of text transcripts that are associated with the topics.

6. The method of claim 4, wherein the key phrase model is trained based on a plurality of training transcripts using unsupervised training, wherein the topic model is based on the key phrase model using semi-supervised training.

7. The method of claim 1, wherein determining the plurality of subtopics is based on clustering the topic into a cluster and identifying the plurality of subtopics in the cluster; and
   wherein clustering the topic is performed using an unsupervised training algorithm.

8. A non-transitory computer-readable storage medium, the computer-readable storage medium including instructions that when executed by a processor, cause the processor to:
   receive, by an application, a query comprising a topic;
   determine, by a topic model, a plurality of subtopics based on the topic;
   receive, by the application from a database based on the topic and plurality of subtopics, a plurality of text transcripts, each transcript associated with a respective communication session;
   compute, by a sentiment model for each text transcript, a respective sentiment score based on a text of the respective text transcript;
   determine, by the application for each text transcript, a duration of the communication session associated with the respective text transcript;

compute, by the application for each text transcript, a total score based on the sentiment score and the duration of the respective text transcript;

return, by the application as responsive to the query, a subset of the plurality of text transcripts having a total score that exceeds a threshold;

extract, by a key phrase model, a plurality of key phrases from each text transcript of the subset of the plurality of text transcripts;

determine, by the application and based on content of the plurality of key phrases, a system error associated with the application; and transmit, by the application, a notification including the system error to a computing device to address the system error.

9. The computer-readable storage medium of claim 8, wherein the instructions further cause the processor to:

determine, by the application for each communication session, a first amount of time a customer engaged in conversation with an agent;

compute, by the application for each text transcript, a first time score based on the first amount of time;

determine, by the application for each communication session, a second amount of time a customer was on hold; and compute, by the application for each text transcript, a second time score based on the second amount of time, wherein the total score is further based on the first and second time scores.

10. The computer-readable storage medium of claim 9, wherein compute the total score comprises computing a sum of the sentiment score, the first time score, and the second time score.

11. The computer-readable storage medium of claim 8, wherein the instructions further configure the computer to:

output, by the application, the plurality of key phrases for display.

12. The computer-readable storage medium of claim 8, wherein the notification includes the topic determined from the topic model and one or more portions of the plurality of text transcripts that are associated with the topics.

13. The computer-readable storage medium of claim 11, wherein the key phrase model is trained based on a plurality of training transcripts use unsupervised training, wherein the topic model is based on the key phrase model using semi-supervised training.

14. The computer-readable storage medium of claim 8, wherein determining the plurality of subtopics is based on clustering the topic into a cluster and identifying the plurality of subtopics in the cluster; and wherein clustering the topic is performed using a dbscan clustering algorithm.

15. A computing apparatus comprising:
a processor; and
a memory storing instructions that, when executed by the processor, cause the processor to:
  receive, by an application, a query comprising a topic;
  determine, by a topic model, a plurality of subtopics based on the topic;
  receive, by the application from a database based on the topic and plurality of subtopics, a plurality of text transcripts, each transcript associated with a respective communication session;
  compute, by a sentiment model for each text transcript, a respective sentiment score based on a text of the respective text transcript;
  determine, by the application for each text transcript, a duration of the communication session associated with the respective text transcript;
  compute, by the application for each text transcript, a total score based on the sentiment score and the duration of the respective text transcript;
  return, by the application as responsive to the query, a subset of the plurality of text transcripts having a total score that exceeds a threshold;
  extract, by a key phrase model, a plurality of key phrases from each text transcript of the subset of the plurality of text transcripts;
  determine, by the application and based on content of the plurality of key phrases, a system error associated with the application; and
  transmit, by the application, a notification including the system error to a computing device to address the system error.

16. The computing apparatus of claim 15, wherein the instructions further cause the processor to:

determine, by the application for each communication session, a first amount of time a customer engaged in conversation with an agent;

compute, by the application for each text transcript, a first time score based on the first amount of time;

determine, by the application for each communication session, a second amount of time a customer was on hold; and compute, by the application for each text transcript, a second time score based on the second amount of time, wherein the total score is further based on the first and second time scores.

17. The computing apparatus of claim 16, wherein compute the total score comprises computing a sum of the sentiment score, the first time score, and the second time score.

18. The computing apparatus of claim 15, wherein the instructions further cause the processor to:

output, by the application, the plurality of key phrases for display.

19. The computing apparatus of claim 15,
wherein the notification includes the topic determined from the topic model and one or more portions of the plurality of text transcripts that are associated with the topics.

20. The computing apparatus of claim 15, wherein determining the plurality of subtopics is based on clustering the topic into a cluster and identifying the plurality of subtopics in the cluster; and wherein clustering the topic is performed using an unsupervised training algorithm.

* * * * *